Sept. 18, 1956 R. C. LOVICK 2,763,550
SILVER SOUND TRACK ON MULTILAYER COLOR FILMS
Filed June 18, 1953
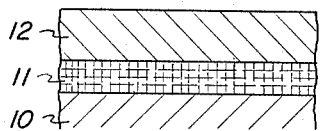
Stage A
SOUND AND IMAGE EXPOSURE, NEGATIVE DEVELOPMENT, ↓ FIXATION OF SOUND AREA, AND COLOR DEVELOPMENT
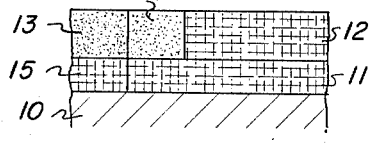
Stage B
↓ HYPO, FERRICYANIDE
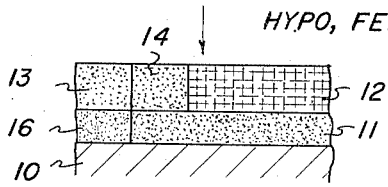
Stage C
↓ WASH, HYPO
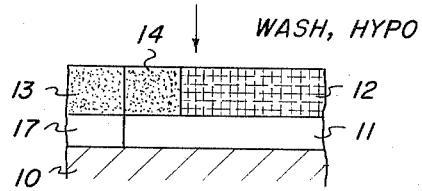
Stage D
↓ FERRICYANIDE
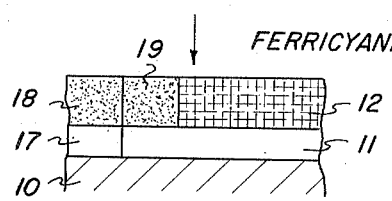
Stage E
↓ REDEVELOP SOUND AREA
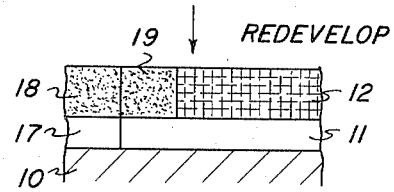
Stage F
↓ HYPO
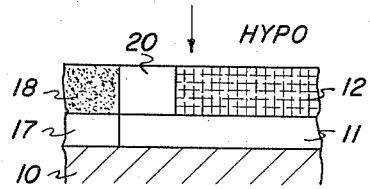
Stage G
ROBERT C. LOVICK
INVENTOR.
BY *Daniel I. Mayne*
*W. H. McDowell*
ATTORNEY & AGENT United States Patent Office 2,763,550
Patented Sept. 18, 1956

2,763,550

SILVER SOUND TRACK ON MULTILAYER COLOR FILMS

Robert C. Lovick, Rochester, N. Y., assignor to Eastman Kodak Company, Rochester, N. Y., a corporation of New Jersey Application June 18, 1953, Serial No. 362,546

6 Claims. (Cl. 95—2)

This invention relates to the processing of photographic elements whereby colloidal silver filter media are selectively removed in the presence of developed silver images and particularly to the formation of silver sound tracks in multilayer color films.

Since the advent of sound in motion picture photography and particularly in motion picture color photography, the incorporation of the sound record into the motion picture film in synchronization with the picture has presented many problems. Not the least of the problems results from the necessity for providing a sound image having high opacity to radiations which projector phototubes are most sensitive. Pronounced success has resulted from the use of silver sulfide sound images incorporated into motion picture color films, for example, by the methods of the Dearing U. S. Patent 2,258,976, granted October 14, 1941. However, common reproducer phototubes employed in the motion picture industry have maximum sensitivities at wavelengths of the order of from 550 to 800 millimicrons. Other photosensitive surfaces have peak sensitivity at from about 1200 to 1400 millimicrons and others as high as 2500 millimicrons. Since it is necessary in the motion picture industry to reproduce sound tracks in a variety of equipment, the peak phototube responses of which vary as indicated, the non-uniform absorption of silver sulfide sound tracks at different wavelengths in the region of from about 550 to 2500 millimicrons produces variations in sound quality beyond tolerable limits. Accordingly, a sound track prepared for one type of photosensitive surface reproduces in an unsatisfactory manner with other types of photosensitive surfaces.

A developed silver sound track is particularly desirable because its opacity to radiations shows little change with wavelength in the visible and infrared regions of the spectrum. On a comparative basis, developed silver varies in absorption only about 0.4 density units and silver sulfide varies about 2.4 density units over a range of wavelength from 400 to 1,000 millimicrons. However, the formation of a silver sound track in a multilayer color film employing a yellow colloidal silver filter layer, with which type of film my invention is primarily concerned, presents a difficult problem inasmuch as it is necessary at some stage in the process to remove the colloidal silver from the filter layer without appreciably affecting the silver sound image. A number of processes have been recommended for preparing silver sound tracks in multilayer color films, for example, as described in U. S. Patents 2,159,280, 2,430,565 and 2,544,906. The process of the first patent results in a combined silver and dye sound image which obviously exhibits the mentioned undesirable variations in absorption with wavelength. The second patent depends upon differential removal of bleached colloidal silver in a filter layer in the presence of a bleached silver sound area which procedure requires much more accurate control than does my process to prevent destruction of the sound image. The third patent involves application of a protective coating to the sound track area during processing, which may be dispensed with in my process as will be apparent from the following description of my invention.

I have discovered a process for selectively removing yellow colloidal silver from a filter layer in a film containing a developed silver image without adversely affecting the developed silver image. In general, my process includes simultaneously treating the colloidal silver and developed silver images in a photographic element with a solution of an ordinary silver halide fixing agent well known in the art, such as an aqueous solution of an alkali metal or ammonium thiosulfate. After removal of excess fixing solution from the element, as by squeegeeing, a conventional silver bleaching solution is applied to the film until only the colloidal silver has been bleached to a silver salt soluble in fixing solution. It is now necessary to wash the element to remove substantially all of the unreacted bleaching agent, otherwise when a fixing solution is subsequently used, both the colloidal silver and the developed silver image would be simultaneously attacked. Thereafter, application of the fixing solution removes the soluble silver salt derived from the colloidal silver without attacking the developed silver image. As will be apparent from the detailed description of the invention following when the process is applied to the formation of a silver sound track in a multilayer color film, an advantage of the process lies in the fact that it can be so operated that only two edge applications of processing solution to the sound track area are required. It is not understood that mechanism is involved; however, the results are separate and distinct from those obtained when the conventional method employing only a bleaching solution, such as ferricyanide, followed by hypo, is employed. The distinction is particularly evident when the process is applied to forming silver sound tracks in film since auditory tests readily demonstrate the higher quality of silver sound track obtained by my process than obtained by other known methods.

The figures of the accompanying drawings show in greatly enlarged cross-sectional view, the appearance of a segment of a multilayer color film at various stages in the formation of a sound track according to the method of my invention.

My invention will be readily understood by consideration of the following detailed example with reference to the figures of the accompanying drawings.

A conventional multilayer color film is provided having red, green and blue-sensitive emulsion layers superposed on a support in that order and having a well known yellow colloidal silver (Carey Lea silver) filter layer interposed between the blue and green-sensitive emulsion layers. Reference may be made to the Mannes et al. U. S. Patent 2,252,718, granted August 19, 1941, for a multilayer film having this structure and for the general process for obtaining subtractively colored dye images in the film. Stage A of the accompanying drawings illustrates the appearance of a segment of such a film including a portion of the green-sensitive emulsion layer 10, the colloidal silver filter layer 11, and the blue-sensitive emulsion layer 12. The process illustrated in the drawings assumes the formation of the sound image only in the blue-sensitive emulsion layer 12 although it may be present at least in part in the underlying green and red-sensitive emulsion layers, depending upon the manner of exposing the sound track area. In a well known manner the film is then exposed in the sound and picture areas, developed in a black-and-white negative developer, preferably washed and then the sound track area only is fixed out by edge application of a hypo solution. Preferably after washing the film, dye images are then formed in the picture areas of the differently sensitized emulsion layers by means of reversal exposure and color development as disclosed in the above U. S. Patent 2,252,718. The filter layer 11 and the blue-sensitive emulsion layer 12 now appears substantially as shown in Stage B of the drawings in which area 13 represents the silver sound image which may be of either the variable width or variable density type. Area 14 is the silver negative corresponding to the exposure to the blue aspect of the colored subject, the balance of this layer being occupied by the yellow dye image obtained in color development. In layer 11 will be noted the area 15 of the colloidal silver filter layer. The colloidal silver in this area is of primary concern since it is important that it be fully removed in the subsequent processing to provide clear highlights in the sound track area.

According to my invention, the film which has been color developed and washed to free it of residual developer components is now saturated with fixing solution in at least the sound track area but preferably throughout. Solutions of the well known thiosulfate silver halide fixing agents are suitable for this purpose. An especially useful solution is a 2.4% alcoholic ammonia fixing solution made by adding a water-soluble lower alcohol to ammonia hypo solution, for example, 100 cc. of methyl alcohol and 250 cc. of 60 percent aqueous ammonium thiosulfate made up to one liter with water. This particular solution can be applied to the film for 15 or more seconds. Aqueous solutions of either alkali metal or ammonium thiosulfate, such as sodium thiosulfate, can be employed similarly. As a result of this treatment of the film with fixing solution, the colloidal silver and very fine-grained silver existing in the film as fog are rendered selectively bleachable in the presence of the coarser grained negative silver image, in known solutions, for example, ferricyanide solution, which convert silver to silver salt soluble in fixing solution. However, it is observed that under these conditions the finer grains of the negative silver image are not materially rendered bleachable. Of course, some residual silver halide in the film is removed in the fixing solution.

A silver bleaching solution is now applied to at least the sound track area of the film but preferably to the whole emulsion layer until the colloidal silver has been bleached but has had little effect on the silver sound image. For this purpose the following solution may be applied to the film for approximately 15 seconds until the colloidal silver has been selectively bleached:

| | |
|---|---|
| Water _____cc__ | 800 |
| Sodium hexametaphosphate_____gms__ | 0.6 |
| Potassium ferricyanide_____gms__ | 139.0 |
| Potassium bromide_____gms__ | 15.0 |
| Sodium chloride_____gms__ | 20.0 |
| Water to 1000 cc. | |

It will be apparent that the time of treatment of the film with the bleaching solution will vary somewhat, depending on the amount of colloidal silver present per unit area of the film and the activity of the bleaching solution which is somewhat dependent upon the concentration of the active ingredients as well as the particular bleaching agent employed. Simple experiments will demonstrate the optimum conditions. If desired, other well known silver bleaching solutions, such as the quinone-hydrochloric acid bleaching solution, can be employed in this step of the process.

The bleached film appears substantially as shown in Stage C of the drawings in which the colloidal silver in layer 11, particularly in area 16, has been bleached and the silver images 13 and 14 and the yellow dye image are unchanged.

After bleaching the colloidal silver as above, it is now essential to wash the film until substantially all active ingredients of the bleaching solution have been removed from the film, for example, for about one minute. A silver salt fixing solution such as the above ammonia hypo solution is now applied to the film for about 10 seconds or at least until the bleached colloidal silver has been removed from the film. Stage D shows the film as now cleared of colloidal silver in layer 11, particularly in area 17, and the images in the emulsion layer 12 are unchanged.

The film is now bleached in a suitable silver bleaching solution such as given above, particularly to render the negative silver image 14 capable of fixation. The film appears as shown in Stage E, the sound image 18 and the negative image 19 now being composed of soluble silver salt such as silver halide. The film is then redeveloped only in the sound track area by edge application to convert the sound image back to silver using any of the well known fogging developer compositions. The following solution is particularly useful for this purpose:

Part A

| | |
|---|---|
| Water _____cc__ | 600 |
| Sodium sulfite (anhydrous)_____gms__ | 80 |
| Hydroquinone _____gms__ | 100 |
| Ethyl alcohol (95%)_____cc__ | 130 |
| Water to 1000 cc. | |

Part B

| | |
|---|---|
| Water _____cc__ | 300 |
| Sodium thiosulfate or sodium hydrosulfite____gms__ | 60 |
| Ethylene diamine (0.1 N)_____cc__ | 40 |
| Potassium iodide_____gms__ | 10 |
| Water to 500 cc. | |

In use, combine 3 parts A with 1 part B.

A solution also suitable for this purpose is an alkaline stannous chloride solution. As shown in Stage F of the drawings, the film now contains the sound image 18, the bleached negative image 19 and the yellow dye image in the remainder of the layer. After washing, treatment of the element of Stage F with ordinary hypo solution removes image 19 leaving only the desired silver sound image 18 and the dye image in the emulsion layer, the negative area 20 having been cleared of silver salts as shown in Stage G of the drawings.

The process of my invention is subject to a number of variations as will be apparent to those skilled in the art. The above detailed process entailed no application of resist material to the sound track area of the film to protect it during processing of the picture area and in that respect only two separate edge applications of processing solutions was required. However, I can apply a resist material such as polyvinyl pyridine to the sound area of the element of Stage B of the drawings by the methods of the Veal and Waugh U. S. Patent 2,544,906, and subsequent processing steps include silver bleach, hypo (removes the resist), washing, hypo, limited bleach, wash and hypo to remove only colloidal silver and soluble silver salts in the picture area. Alternately, the film may be processed as described in detail above to the stage shown in Stage D of the drawings, the resist is then applied to the sound area, the picture area is bleached and the film treated with hypo. Similarly, the resist can be applied at the same stage in the process shown in Stage D of the drawings but in this case using a resist material not removable in hypo solution. Accordingly, the resist remains on the film throughout the processing cycle and provides abrasion protection to the sound track area.

The process can be applied to the removal of colloidal silver in any film containing hydrophilic colloid layers also containing a developed silver image whether the colloidal silver is used as a filter or antihalation layer. It is only necessary to first treat the element with hypo solution, followed by the silver bleaching solution, washing and again hypo solution as in the manner described. When the process is applied to multilayer color films, the order of arrangement of the emulsion layers of different sensitivity and the colloidal silver filter layer upon a support is not critical insofar as other requirements for a satisfactory color process are met. Films of the mixed grain type having, for example, films containing a blue-sensitive emulsion layer separated by a colloidal silver filter layer from an emulsion layer of a mixture of red- and green-sensitive silver halide grains are likewise adaptable to processing to remove the colloidal silver filter layer in the manner described above. In cases where it is desired for any reason to retain in color films a silver image such as a silver masking image, colloidal silver filter media are selectively removable from the film in the presence of such a silver image in the manner of my invention. If desired, the colloidal silver filter media in the color films mentioned in this specification may be dispersed in one of the emulsion layers instead of being present in a separate layer.

My process is adaptable to the removal of colloidal silver filter media from multilayer color films developed to colored images by either the selective reversal exposure and color development method described in detail above, or by conventional negative-positive processes wherein color development of emulsions containing coupler compounds takes place immediately following explosure to a colored subject. Suitable methods for making such multilayer color films are described in the Mannes et al. U. S. Patent 2,304,940 and the Jelley et al. U. S. Patent 2,322,027 and elsewhere. As stated above, in such processes it may be desirable to retain in the film a silver image such as a silver sound or masking image and my novel process of treating a film at a stage when it contains colloidal silver, a developed silver image and dye images, with successive hypo, bleach, wash and hypo solutions, removes the colloidal silver without affecting the developed silver images.

I claim:

1. A method for selectively removing yellow colloidal silver from a light filtering layer of a photographic element containing a developed silver image in a separate layer, which comprises simultaneously treating the colloidal silver and the silver image with an aqueous solution of a compound of the group consisting of alkali metal and ammonium thiosulfates until the colloidal silver is selectively bleachable with ferricyanide silver bleaching solution in the presence of the silver image, thereafter, while retaining the thiosulfate in the element, simultaneously treating the collodial silver and the silver image with the ferricyanide silver bleaching solution to convert only the colloidal silver to a silver salt soluble in photographic fixing solution, washing the element until it is substantially free of the bleaching solution, and removing said silver salt from the element by means of a fixing solution, leaving the silver image substantially unchanged.

2. A method for selectively removing yellow colloidal silver from a light filtering layer of a photographic element containing a developed silver sound image in a separate layer, which comprises simultaneously treating the colloidal silver and the silver image with an aqueous solution of a compound of the group consisting of alkali metal and ammonium thiosulfates until the colloidal silver is selectively bleachable with ferricyanide silver bleaching solution in the presence of the silver image, thereafter, while retaining the thiosulfate in the element, simultaneously treating the colloidal silver and the silver image with the ferricyanide silver bleaching solution to convert only the colloidal silver to a silver salt soluble in photographic fixing solution, washing the element until it is substantially free of the bleaching solution, and removing said silver salt from the element by means of a fixing solution, leaving the silver image substantially unchanged.

3. A method for selectively removing yellow colloidal silver from a light filtering layer of a photographic element containing a developed silver sound image in the sound area of the element and color-developed silver and dye images in the picture area of the element, which comprises simultaneously treating the colloidal silver in the filter layer and the silver sound image with an aqueous solution of a compound of the group consisting of alkali metal and ammonium thiosulfates until the colloidal silver is selectively bleachable with ferricyanide silver bleaching solution in the presence of the silver sound image, thereafter, while retaining the thiosulfate in the element, simultaneously treating the colloidal silver and the silver sound image with the ferricyanide silver bleaching solution until only the colloidal silver in the sound area of the element has been converted to a silver salt soluble in photographic fixing solution, washing the element until it is substantially free of the silver bleaching solution, and removing said silver salt from the element by means of a fixing solution, leaving the silver sound and dye images substantially unchanged.

4. A method for preparing a silver sound track in a multilayer color film containing superposed light-sensitive silver halide emulsion layers sensitized to different primary regions of the visible spectrum and having a yellow colloidal silver filter layer interposed between two of the emulsion layers, which comprises forming a silver sound image in the sound area of the film and silver and dye images in the picture area of the film by means of exposure and development, treating at least the sound area of the film with an aqueous solution of a compound of the group consisting of alkali metal and ammonium thiosulfates until only the colloidal silver of the filter layer is bleachable with ferricyanide silver bleaching solution, thereafter, while retaining the thiosulfate in the element, treating the film at least in the sound area with ferricyanide silver bleaching solution until only the colloidal silver has been converted to a silver salt soluble in photographic fixing solution, washing the film until it is substantially free of ferricyanide solution, removing said silver salt from the sound area of the film by means of a fixing solution, converting all silver in the film to a silver salt soluble in fixing solution, redeveloping the last mentioned silver salt only in the sound image area to silver and removing the silver salts remaining in the film by means of fixing solution, leaving a silver sound image and dye images in the film.

5. A method for preparing a silver sound track in a multilayer color film containing superposed light-sensitive silver halide emulsion layers sensitized to different primary regions of the visible spectrum and having a yellow colloidal silver filter layer interposed between two of the emulsion layers, which comprises forming a silver sound image in the sound area of the film and silver and dye images in the picture area of the film by means of exposure and development, treating the entire film with an aqueous solution of a compound of the group consisting of alkali metal and ammonium thiosulfates until only the colloidal silver of the filter layer is bleachable with ferricyanide silver bleaching solution, thereafter, while retaining the thiosulfate in the element, treating the entire film with ferricyanide silver bleaching solution until only the colloidal silver has been converted to a silver salt soluble in photographic fixing solution, washing the film until it is substantially free of ferricyanide solution, removing said silver salt from the sound area of the film by means of a fixing solution, converting all silver in the film to a silver salt soluble in fixing solution, redeveloping the last mentioned silver salt only in the sound image area to silver and removing the silver salts remaining in the film by means of fixing solution leaving a silver sound image and dye images in the film.

6. The process of claim 4 wherein the multilayer color film used contains red, green and blue light-sensitive silver halide emulsion layers, the blue-sensitive emulsion layer being outermost and separated from the other emulsion layers by means of the yellow colloidal silver filter layer.

References Cited in the file of this patent

UNITED STATES PATENTS 2,341,508    Schneider et al. _____ Feb. 8, 1944